(12) United States Patent
Ito (10) Patent No.: US 8,400,658 B2
(45) Date of Patent: Mar. 19, 2013

(54) NETWORK DEVICE AND WORKFLOW PROCESSING SYSTEM

(75) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 12/472,529

(22) Filed: May 27, 2009

(65) Prior Publication Data
US 2009/0303532 A1 Dec. 10, 2009

(51) Int. Cl.
*G06F 3/12* (2006.01)

(52) U.S. Cl. ........ 358/1.15; 358/1.1; 358/1.9; 358/1.13; 358/402

(58) Field of Classification Search .................. 358/1.15, 358/1.1, 1.9, 1.13, 402; 705/1, 2, 67
See application file for complete search history.

(56) References Cited

U.S. PATENT DOCUMENTS

| 6,230,109 | B1 * | 5/2001 | Miskimins et al. | 702/109 |
| 6,728,947 | B1 * | 4/2004 | Bengston | 717/103 |
| 2005/0068547 | A1 * | 3/2005 | Negishi et al. | 358/1.1 |
| 2005/0273616 | A1 * | 12/2005 | Nishio | 713/176 |
| 2006/0170938 | A1 * | 8/2006 | Ibarluzea et al. | 358/1.9 |
| 2006/0274361 | A1 | 12/2006 | Kobayashi et al. | 358/1.15 |
| 2007/0028207 | A1 | 2/2007 | Nakata et al. | 717/100 |
| 2007/0047454 | A1 * | 3/2007 | Fujii | 370/245 |

FOREIGN PATENT DOCUMENTS

| JP | 2002-016747 A | 1/2002 |
| JP | 2006-338544 A | 12/2006 |
| JP | 2007-034562 | 2/2007 |
| JP | 2007-060404 A | 3/2007 |

\* cited by examiner

*Primary Examiner* — King Poon
*Assistant Examiner* — Allen H Nguyen
(74) *Attorney, Agent, or Firm* — Fitzpatrick, Cella, Harper & Scinto

(57) ABSTRACT

A system which executes a workflow without a management apparatus immediately notifies the user of an error which has occurred in a device. When an error occurs in a job in a device which is executing the workflow, the device which shares the workflow with other devices transmits the log of the error to a device of the end stage of the workflow in accordance with the flow of the workflow.

9 Claims, 9 Drawing Sheets

```
<?xml version = "1.0" encoding = "utf-8"?>
<Jobflow id = "123" caption ="PURCHASING APPLICATION 1" comment = ".." data = ".." notifyLog = "true">  ~401
  <Job id = "Scan">  ~402
    <Setting>...</ Setting>
  </Job>
  <Job id = "Send" notifyLog = "true">  ~403
    <Setting>
      <Address type = "FileServer">
        <ServerName>DeviceB</ ServerName>  ~404
        <FolderName>HotFolderB</FolderName>  ~405
        <Login type = "SingleSignOn"/>
      </Address>
      <DocumentName>APPLICATION DOCUMENT</DocumentName>
      <FileFormat>PDF</FileFormat>
    </Setting>
  </Job>
</Jobflow>
```

FIG. 5

```xml
<?xml version = "1.0" encoding = "utf-8"?>
<Jobflow id = "222" caption = "PURCHASING APPLICATION 2" comment = ".." data = ".." notifyLog = "true">  ~501
  <Job id = "HotFolderDocument">  ~502
    <Setting>
      <FolderName>HotFolderB</FolderName>
      <FileFormat>PDF</FileFormat>
    </Setting>
  </Job>
  <Job id = "SaveToDataBase">  ~503
    <Setting>
      <Query>..</Query>
      <Param p1 = ".." p2 = ".." p3 = ".."/>
      <Result>..</Result>
    </Setting>
  </Job>
  <Job id = "CreateDocument" type = "ReplaceTarget">  ~504
    <Setting>
      <Template>RESULT REPORT</Template>
      <Param p1 = ".." p2 = ".." p3 = ".."/>
      <FileName></FileName>
    </Setting>
  </Job>
  <Job id = "Send" notifyLog = "true">  ~505
    <Setting>
      <Address type = "FileServer">
        <ServerName>DeviceC</ServerName>
        <FolderName>HotFolderC</FolderName>
        <Login type = "SingleSignOn"/>
      </Address>
      <DocumentName>RESULT REPORT</DocumentName>
      <FileFormat>PDF</FileFormat>
    </Setting>
  </Job>
</Jobflow>
```

FIG. 6

```xml
<?xml version = "1.0" encoding = "utf-8"?>
<Jobflow id = "333" caption = "PURCHASING APPLICATION 3" comment = ".." data = ".." notifyLog = "true">
<Job id = "HotFolderDocument">
  <Setting>
    <FolderName>HotFolderC</FolderName>
    <FileFormat>PDF</FileFormat>
  </Setting>
</Job>
<Job id = "Print" notifyLog = "true">
  <Setting>
    <Color>GrayScale</Color>
    <Paper>A4</Paper>
    <Copies>1</Copies>
  </Setting>
</Job>
</Jobflow>
```

NETWORK DEVICE AND WORKFLOW PROCESSING SYSTEM

BACKGROUND OF THE INVENTION

1. Field of the Invention

The present invention relates to a network device and workflow processing system, and particularly, to a workflow processing system which connects a plurality of image forming apparatuses such as digital multi-function peripherals, and uses the image forming apparatuses as execution devices to execute a workflow.

2. Description of the Related Art

In recent years, multi-functional apparatuses (to be referred to as digital multi-function peripherals hereinafter) which are based on a digital copying machine and have a number of functions have come into practical use. For example, the digital multi-function peripherals perform facsimile communication using a built-in scanner or printer. The digital multi-function peripherals also rasterize code data sent from a computer into bitmap data, and print it using the printer. Furthermore, the digital multi-function peripherals use the scanner to transmit images read by the scanner onto a network, and use the printer to print the images distributed from the network. Such functions have been added to the digital multi-function peripherals. Some digital multi-function peripherals also provide a box function. The box function stores print images and scanned images in storage areas which are prepared in the storage device of a digital multi-function peripheral in correspondence with respective users or sections, and outputs the images as needed.

There has also been proposed a system which implements a workflow using a plurality of digital multi-function peripherals connected to a network by utilizing such functions. In a workflow for approving an application form, for example, the applicant scans the application form and sends the data to an approver. Upon receiving the data, the approver executes approval processing and sends the data to the next approver. The final approver notifies the applicant of an approval, and saves the application form in a designated server or the like.

There is also a workflow for executing processing using different functions in respective digital multi-function peripherals. For example, digital multi-function peripheral A scans a document and transmits document data to next digital multi-function peripheral B. Digital multi-function peripheral B which has received the document data registers it with a server, and transmits a registration result such as location information to next digital multi-function peripheral C. Digital multi-function peripheral C which has received the registration result acquires the document data from the server and outputs it onto a paper medium.

To implement a workflow using a plurality of digital multi-function peripherals as explained above, there has been proposed a configuration in which a workflow management server managing the flow of a workflow is prepared, as described in, for example, Japanese Patent Laid-Open No. 2007-34562. A configuration without such workflow management server is also available. In the latter configuration, a workflow system is configured by combining a job flow formed by jobs in a digital multi-function peripheral and the hot folder function of the digital multi-function peripheral. The hot folder function is a function of executing a job flow associated with a hot folder upon storing document data in a box area corresponding to the hot folder. The box area is an area prepared in, for example, a storage device such as a HDD for storing data such as document data. It is possible to implement a workflow by combining the functions, and including, as the end job of a job flow in a digital multi-function peripheral, a job for transmitting processed document data to a hot folder of a digital multi-function peripheral which executes the next step. Note that in a digital multi-function peripheral which executes the end step of the workflow, a job for printing or saving received document data is the end process of a job flow.

In the above-described workflow system without any workflow management server, however, if an error occurs halfway through a job flow forming a workflow, the following problems arise.

For example, when an error occurs in registration processing for registering document data with a server, only digital multi-function peripheral B which has executed the registration processing recognizes the result. When, therefore, an error occurs, the processing of the job flow stops at this point. In this case, digital multi-function peripheral C which outputs data onto a paper medium executes no process because it receives no data or instruction from digital multi-function peripheral B. Consequently, the user will never be able to know the reason why the output document of the workflow is not printed. The user, for example, cannot know whether the reason digital multi-function peripheral C does not output the paper sheet of the result is because processing the workflow is requiring a longer amount of time than expected or because an error has occurred in processing.

When a workflow as a whole is not managed as described above, only an apparatus which is processing the workflow can recognize the presence/absence of error occurrence, and if an error occurs, only an apparatus in which the error has occurred can obtain information pertaining to the error such as the apparatus in which the error has occurred and the type of error that occurred. For this reason, when the user suspects that an error has occurred, he/she must refer to logs in all apparatuses, thereby significantly reducing the productivity of error handling.

SUMMARY OF THE INVENTION

The present invention has been made in consideration of the above prior art to solve the above-described problems. More particularly, there are provided an image forming apparatus and workflow processing system which allow a user to immediately recognize the occurrence and content of an error by transmitting an error which has occurred in processing to the devices downstream of a device in which the error has occurred when a workflow is processed using a plurality of devices.

The present invention has the following arrangement. That is, a network device which is connected to a network, and executes a workflow by receiving document data, comprising: an output destination determination unit which determines an output destination of an error log based on workflow settings; and a log output unit which outputs an error log to an output destination of the error log determined based on the workflow settings by the output destination determination unit when a job in the workflow fails, and outputs an error log to an output destination of the error log determined based on the workflow settings by the output destination determination unit upon receiving the error log instead of the document data.

According to the present invention, it is possible to notify the user of an error which has occurred in any apparatus that was processing a workflow involving a plurality of apparatuses. Furthermore, by transmitting error contents to the apparatuses through the same path as for the document data processed by the workflow, the apparatus at the end of the workflow can inform the user of the error before the time at which the processing of document data normally completes.

Further features of the present invention will become apparent from the following description of exemplary embodiments.

DESCRIPTION OF THE EMBODIMENTS

Figure 1:
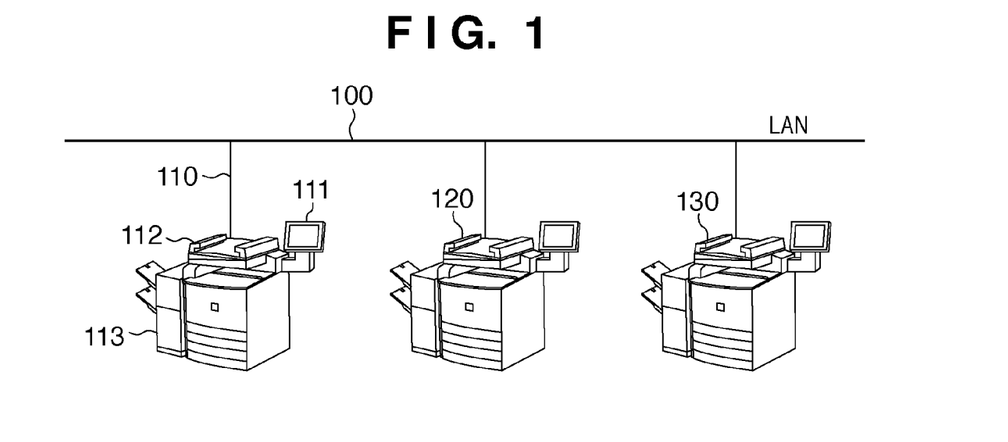
FIG. 1 is a view showing the overall configuration of a workflow system.

FIG. 1 is a view showing the overall configuration of a workflow system to which the present invention is applicable. As shown in FIG. 1, digital multi-function peripherals 110, 120, and 130 are connected to a LAN 100 such as Ethernet®. Note that the connection count is not limited to this in the system of the present invention. Also, although a LAN is applied as a connection method in this embodiment, the present invention is not limited to this. For example, any network such as a WAN (public network), a serial transmission method such as USB, and a parallel transmission method such as the Centronics and SCSI are applicable. Although a digital multi-function peripheral serves as a network device which executes a job flow, other devices such as a general-purpose computer may be used. Note that these devices have to have a function of executing a job flow, and a hot folder function, as will be described later.

Each of the digital multi-function peripherals 110, 120, and 130 has a copy function and a facsimile function as well as a data transmission function of transmitting image data (to also be referred to as document data hereinafter) obtained by reading an original image to a designated apparatus on the LAN 100. Furthermore, each digital multi-function peripheral can create an e-mail message attached with an image as an attached file and transmit it using a mail server (not shown). Each digital multi-function peripheral also has a PDL (Page Description Language) interpretation function and rendering function, and can receive PDL data from a computer (not shown) connected to the LAN 100 and print it. It is possible to save image data read by the digital multi-function peripheral 110 and PDL data instructed by the computer connected to the LAN 100 in the specific area of a hard disk within the digital multi-function peripheral 110. It is also possible to read an original image and save it as digital image data in the hard disk. Furthermore, it is possible to print, as an image, the digital image data saved in the hard disk.

Figure 2:
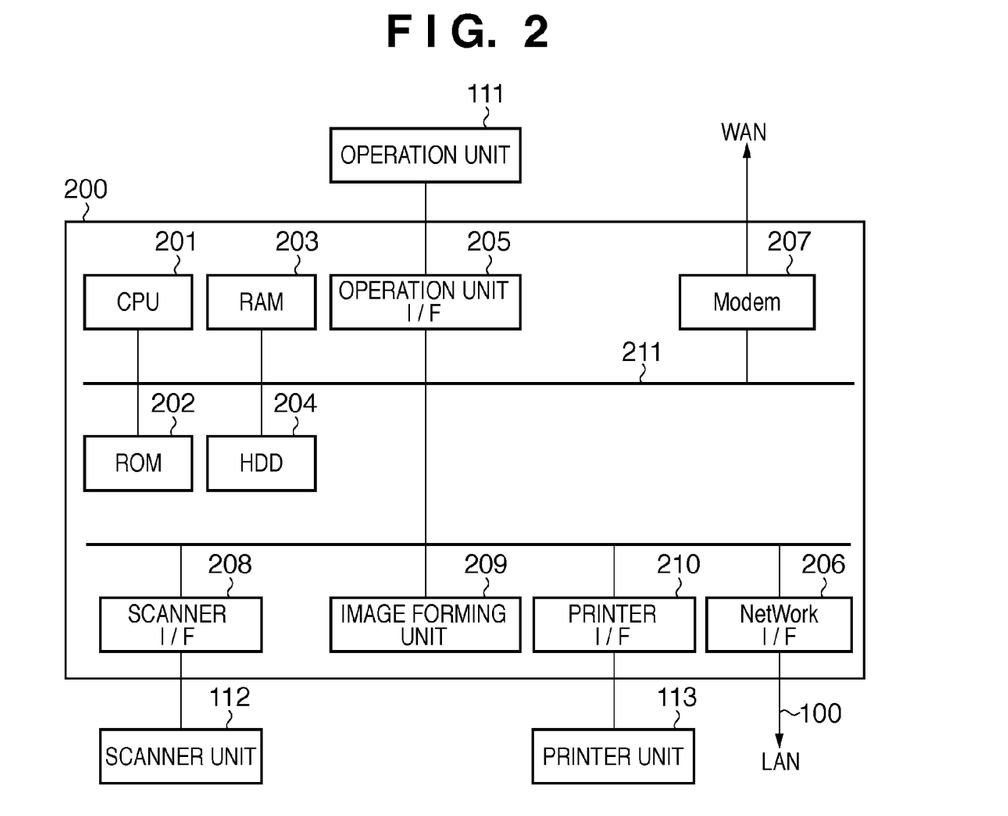
FIG. 2 is a block diagram showing the hardware configuration of a digital multi-function peripheral.

The digital multi-function peripheral 110 is formed from the following components, as shown in FIG. 2. That is, the digital multi-function peripheral 110 includes a scanner unit 112 serving as an image input digital multi-function peripheral, a printer unit 113 serving as an image output digital multi-function peripheral, a controller unit 200 (FIG. 2) for controlling the digital multi-function peripheral 110, and an operation unit 111. The digital multi-function peripherals 120 and 130 have the same arrangement.

The scanner unit 112 converts image information into electrical signals by inputting reflected light obtained by exposing and scanning the image on a document to the CCDs. Furthermore, the scanner unit 112 converts the electrical signals into luminance signals including R, G, and B colors, and outputs the luminance signals as digital image data to the controller unit 200. Note that a document is set on a document feeder. When the user inputs a read start instruction from the operation unit 111, the controller unit 200 sends a document read instruction to the scanner unit 112. Upon receiving this instruction, the scanner unit 112 feeds documents one by one from the document feeder, and reads respective documents. The document read method is not limited to an automatic feed method using the document feeder. A method of scanning a document by placing the document on a glass surface (not shown) and moving an exposure unit may be used.

The printer unit 113 serves as an image forming digital multi-function peripheral which forms an image on a paper sheet based on image data received from the controller unit 200. Note that an electrophotographic method using a photosensitive drum or photosensitive belt is adopted as an image forming method but the present invention is not limited to this. For example, an ink-jet method of discharging ink from a micro-nozzle array to print an image on a paper sheet is applicable.

The controller unit 200 is electrically connected to the operation unit 111, scanner unit 112, and printer unit 113, while connecting to the LAN 100 via a network interface 206. That is, the controller unit 200 is also connected to other digital multi-function peripherals, servers, client PCs, and the like via the LAN 100. This makes it possible to input/output image data and digital multi-function peripheral information.

A CPU 201 comprehensively controls access to various digital multi-function peripherals in connection with itself and access from other digital multi-function peripherals based on, for example, a control program stored in a ROM 202. In addition, the CPU 201 comprehensively controls various processes executed within the controller unit 200. This control processing includes execution of programs for implementing procedures in FIGS. 7 to 10 (to be described later).

The ROM 202 stores the boot program of the apparatus, programs for implementing the procedures in FIGS. 7 to 10, and the like. A RAM 203 serves as a system work memory for operation of the CPU 201, and also serves as a memory for temporarily storing image data. The RAM 203 includes an area in which stored content is maintained even after power-off of the apparatus main body by, for example, the backup of a power supply, and an area in which stored content is erased after power-off.

An HDD 204 serves as a hard disk drive, which can store system software and image data.

An operation unit I/F 205 serves as an interface unit for connecting a system bus 211 and the operation unit 111. The operation unit I/F 205 receives image data to be displayed on the operation unit 111 from the system bus 211, and outputs it to the operation unit 111. The operation unit I/F 205 also outputs information input from the operation unit 111 to the system bus 211.

The network I/F 206 is connected to the LAN 100 and the system bus 211 to input/output information. A modem 207 is connected to a WAN (not shown) and the system bus 211 to input/output information.

A scanner I/F 208 corrects, processes, and edits image data received from the scanner unit 112. The scanner I/F 208 has a function of determining the type of received image data, that is, a color or monochrome document, or a text or photographic document. The scanner I/F 208 then adds a determination result to the image data. The added information will be referred to as attribute data.

An image forming unit 209 changes the orientation and compresses/decompresses image data. The image forming unit 209 can also composite images saved in the HDD 204 to obtain a single image.

A printer I/F 210 receives image data sent from the image forming unit 209, and performs image formation on the image data with reference to attribute data added to the image data. The printer I/F 210 outputs the image data having undergone image formation to the printer unit 113.

For example, a user instruction to the digital multi-function peripheral 110 and information presentation to the user may be done through the operation unit 111, or through a client 150 connected via the LAN 100.

Figure 3:
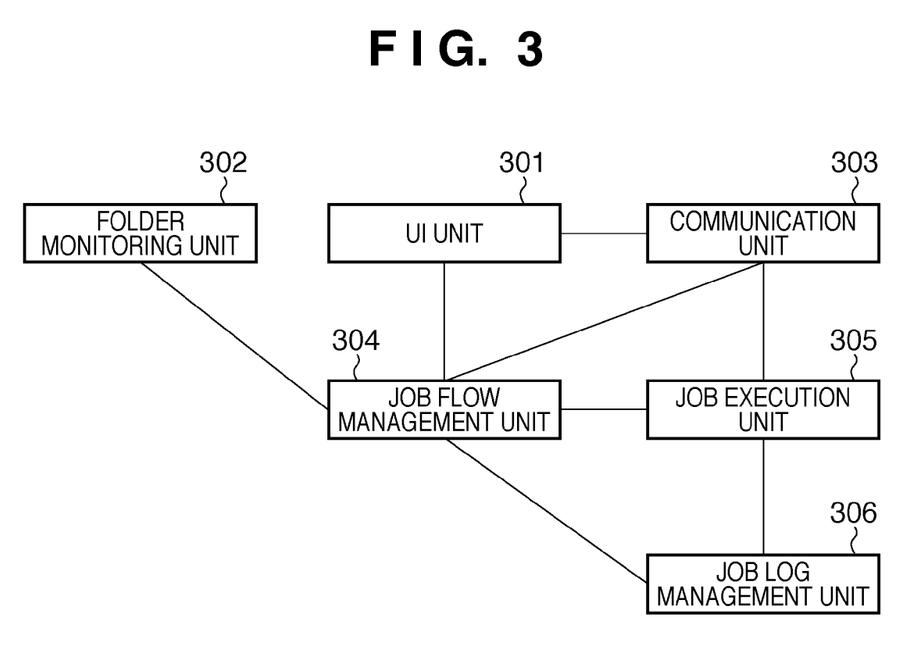
FIG. 3 is a block diagram showing the software configuration of the digital multi-function peripheral.

FIG. 3 is a block diagram showing the configuration of the software modules of the digital multi-function peripheral 110, which are associated with control of various functions (to be referred to as jobs hereinafter) of the digital multi-function peripheral. The CPU 201 executes the software modules.

A UI unit 301 is a software module which displays data on the operation unit 111 via the operation unit I/F 205, and processes a user input from the operation unit 111. A folder monitoring unit 302 is a software module which monitors files stored in a specific storage area within the HDD 204 named "box area". More particularly, the unit 302 monitors that a data file is input (i.e., stored) in a folder designated as a hot folder. Upon detecting input of a data file, the unit 302 starts execution of a job flow associated with the hot folder.

A communication unit 303 is a software module which operates the network I/F 206 and the modem 207 to perform communication.

A job flow management unit 304 is a software module which analyzes the setting file of a job flow, and instructs a job execution unit 305 to execute corresponding processing. The job execution unit 305 is a software module which executes various jobs based on the setting information of the jobs. Note that since a workflow is implemented as job flows that are successively processed, the settings of a job flow included in the workflow form part of the settings of the workflow, that is, form the workflow settings.

A job log management unit 306 is a software module which manages the logs of jobs executed by the job execution unit 305.

Various jobs occur by requests from the UI unit, communication unit, and flow management unit. Upon receiving a copy or scan instruction from the user, for example, the UI unit 301 passes the job settings of a copy or scan job to the job execution unit 305. Likewise, when another digital multi-function peripheral or PC passes job settings via the communication unit, the same processing is executed. Note that how the software modules cooperate with each other to execute a job flow by the CPU 201 will be explained later.

The flow of error processing will be described below using, as an example, a workflow formed by combining the following job flows: "the digital multi-function peripheral 110 scans an image, and transmits it to the digital multi-function peripheral 120", "the digital multi-function peripheral 120 receives a document from the digital multi-function peripheral 110 from a hot folder, stores the document in a database, and transmits a storage result to the digital multi-function peripheral 130", and "the digital multi-function peripheral 130 receives the document from the digital multi-function peripheral 120 from a hot folder, and prints the received document".

<Example of Job Flow Setting Information>

Figure 4:
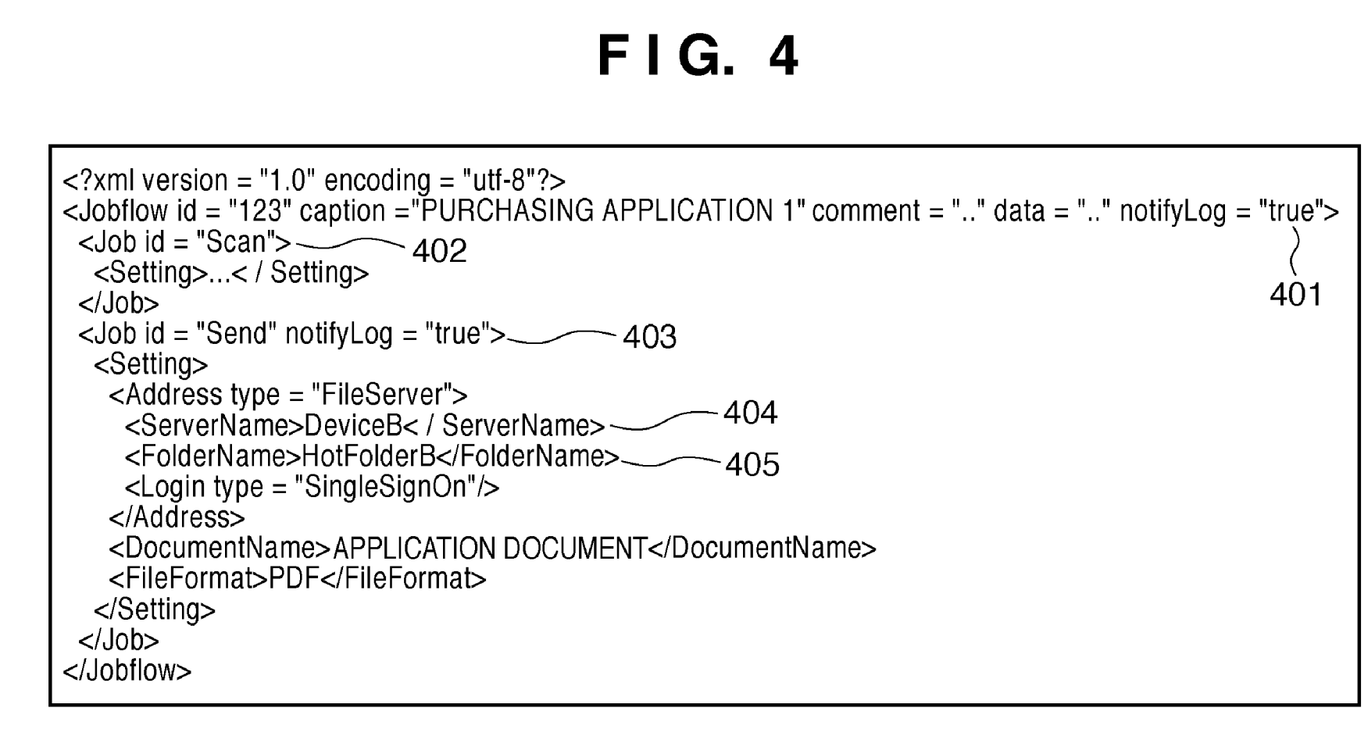
FIG. 4 is a view showing job flow setting example 1.

FIG. 4 shows an example of a job flow setting file (setting information) on which job flow settings previously set in the digital multi-function peripheral 110 are described. FIG. 4 shows a setting example of the job flow "the digital multi-function peripheral 110 scans an image, and transmits it to the digital multi-function peripheral 120". In this embodiment, assume that the job flow setting file is described in an XML format. The setting file, however, may be described using a format other than the XML format.

A tag 401 indicates job flow outline information. In the example of FIG. 4, the tag 401 includes a job flow ID ("123"), a job flow name ("purchasing application 1"), a comment (blank), date of creation (blank), and a flag ("true") representing whether an error in the job flow is notified.

A tag 402 indicates a scan job as a start job included in the job flow. A single job included in a job flow will be referred to as a job element of the job flow. Read settings are described in the child elements of this tag, but they have been omitted here. A tag 403 indicates a transmission job as a job element succeeding the scan job. A flag ("notifyLog=true") representing that the job is one for which a notification is sent when an error occurs is set as an attribute of the transmission job. A child element 404 designates DeviceB, that is, the digital multi-function peripheral 120 as a transmission destination. A child element 405 designates a shared folder "HotFolderB". That is, the transmission destination is defined as the folder "HotFolderB" of the digital multi-function peripheral 120. Other elements describe settings necessary for transmission. Assume that the appearance order of job tags within the job flow setting XML file represents the job processing.

Figure 5:
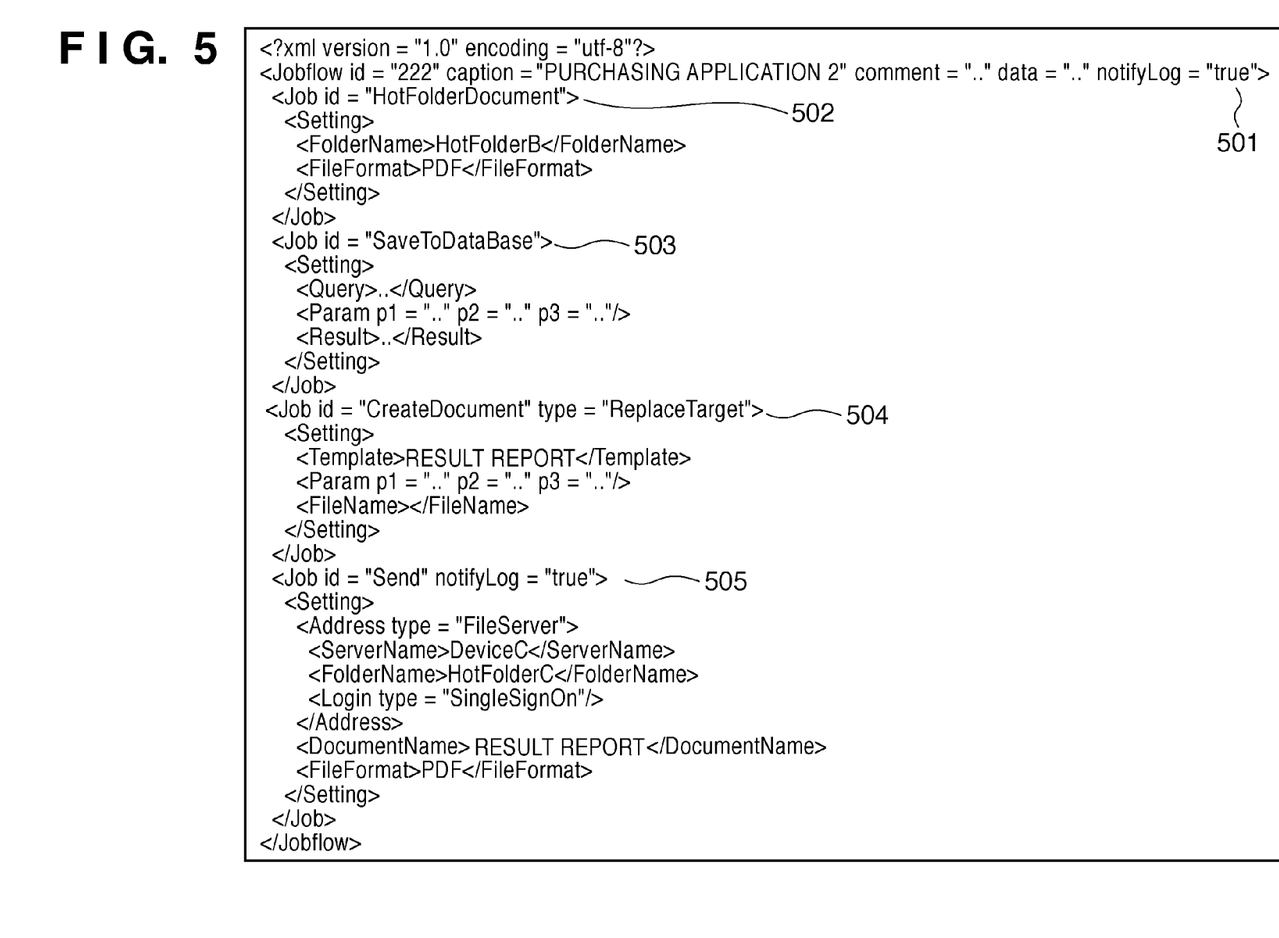
FIG. 5 is a view showing job flow setting example 2.

FIG. 5 shows an example of a job flow setting file previously set in the digital multi-function peripheral 120. This job flow setting file shows a setting example of the job flow "the digital multi-function peripheral 120 receives a document from the digital multi-function peripheral 110 from a hot folder, stores the document in a database, and transmits a storage result to the digital multi-function peripheral 130".

A tag 501 indicates job flow outline information, similarly to the tag 401. A tag 502 represents an input job from a hot folder. The child elements of this tag indicate that a file in a PDF format becomes the target document of the job flow when it is input to a folder "HotFolderB".

A tag 503 indicates a job for saving data in a database. In this example, assume that the database is created in the HDD of the digital multi-function peripheral 120. The child elements of this tag describe settings for storing the current target document in the database.

A tag 504 indicates a job for creating a document. In this example, the job composites a database storage result and a template "result report" previously stored as a document in the box area. Furthermore, the job changes the target document of the job flow to the created document.

A tag 505 indicates a transmission job. A flag representing that the job is one for which a notification is sent when an error occurs is set as an attribute of the transmission job. The child elements of this tag designate, as a transmission destination, a shared folder "HotFolderC" of DeviceC, that is, the digital multi-function peripheral 130. Other child elements describe settings necessary for transmission.

Figure 6:
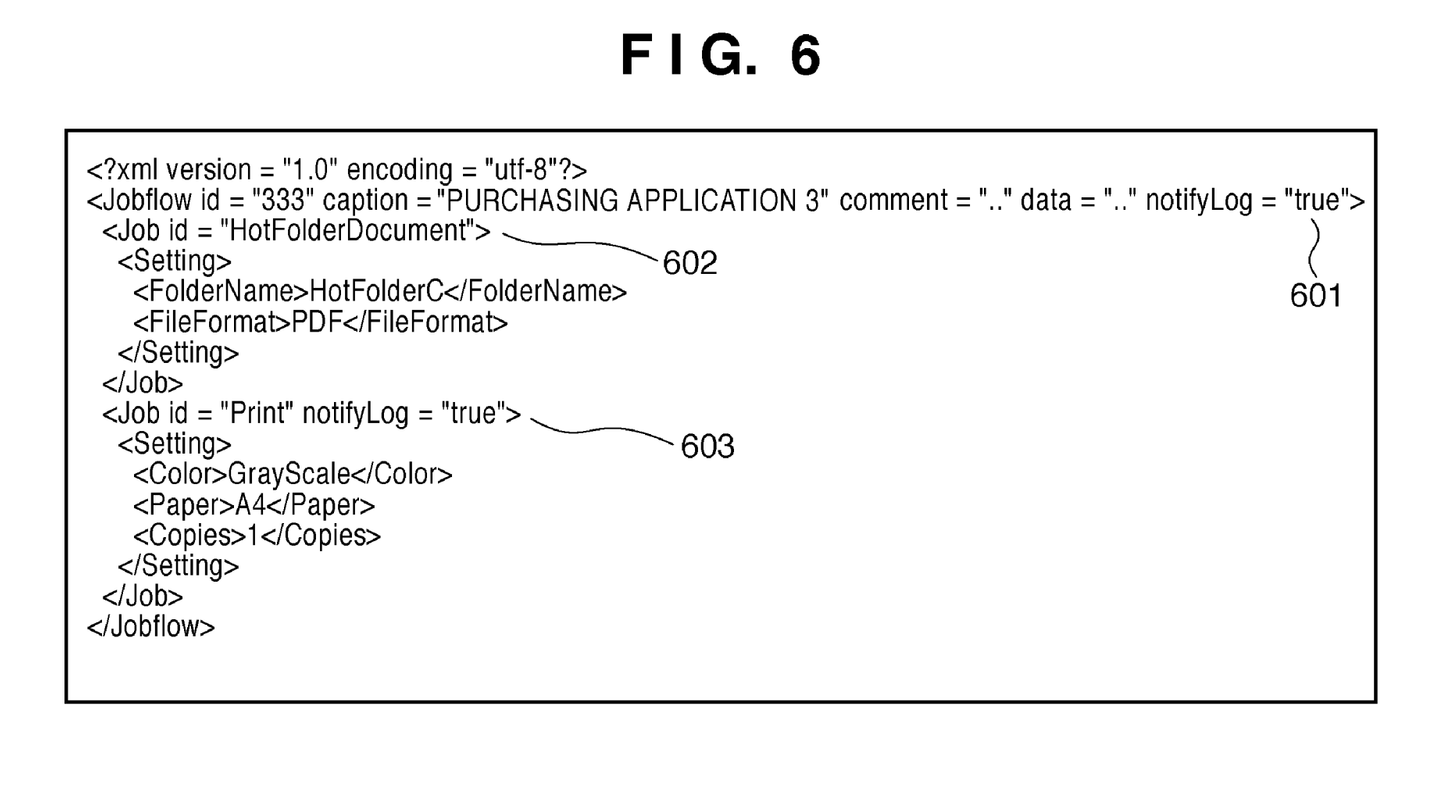
FIG. 6 is a view showing job flow setting example 3.

FIG. 6 shows an example of a job flow setting file previously set in the digital multi-function peripheral 130. The job flow "the digital multi-function peripheral 130 receives a document from the digital multi-function peripheral 120 from a hot folder, and prints the received document" is set. In this embodiment, assume that the job flow setting file is described in the XML format. The setting file, however, may be described using a format other than the XML format.

A tag 601 indicates job flow outline information, similarly to the tags 401 and 501. A tag 602 represents an input job from a hot folder. The child elements of this tag indicate that a file in the PDF format will become the target document of the job flow when it is input to the folder "HotFolderC".

A tag 603 indicates a print job. The child elements of this tag describe settings necessary for printing. In this example, file transmission or server storage is given as an example of this job. It is, however, possible to set a task such as FAX transmission or e-mail transmission.

As described above, each network device saves a previously created job flow setting file. The job flow setting file defines an event serving as a trigger of a job flow, job elements forming the job flow, and the execution order of the job elements.

<Execution Procedure of Job Flow>

A procedure of executing a job flow in the digital multi-function peripheral 110 to start a workflow will now be explained. The digital multi-function peripheral 110 displays, on the operation unit 111, a list of job flows set in the digital multi-function peripheral 110 by executing the processing of the UI unit 301. When the user instructs the digital multi-function peripheral 110 to execute a job flow from the list by using the operation unit 111 of the digital multi-function peripheral 110, the UI unit 301 instructs the job flow management unit 304 to execute the job flow. In this example, a case in which the user instructs the digital multi-function peripheral 110 to execute the job flow described above with reference to FIG. 4 will be explained.

Figure 7:
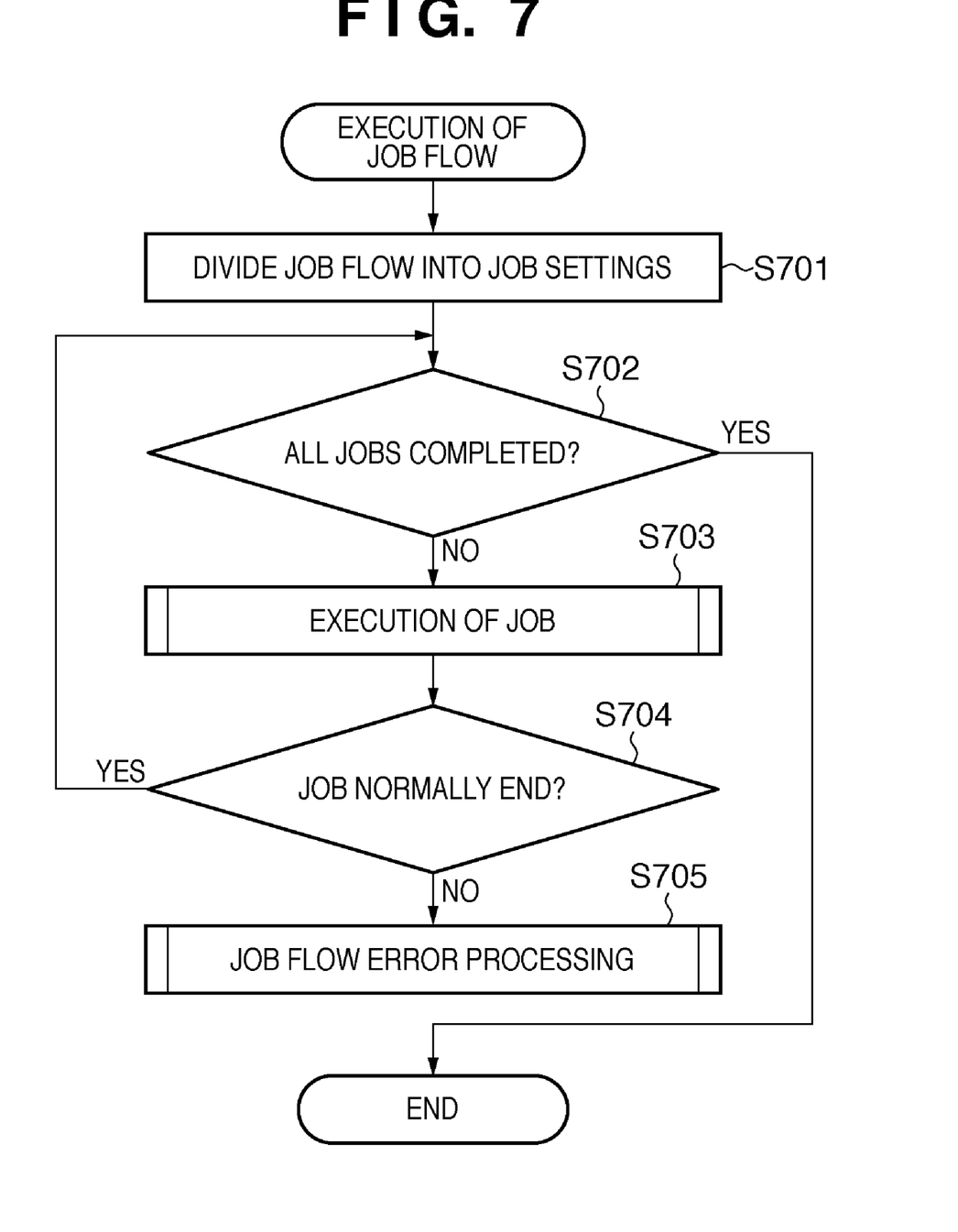
FIG. 7 is a flowchart for explaining execution of a job flow.

FIG. 7 is a flowchart showing the processing flow of the job flow executed in the digital multi-function peripheral 110. In step S701, the job flow management unit 304 divides the settings of the job flow into the settings of a plurality of job elements. In the case of the example in FIG. 4, the settings of the job flow are divided into the settings of the scan job and those of the transmission job.

In step S702, the unit 304 determines whether all the job elements defined in the job flow have been completed. If the unit 304 determines that all the job elements have been completed, the processing of the job flow ends; otherwise, the process advances to step S703.

In step S703, the job flow management unit 304 passes the job settings to the job execution unit 305 and causes the unit 305 to execute the jobs in a setting order in the job flow. The job execution unit 305 executes the jobs based on the job settings. For example, in the case of the scan job, the unit 305 operates the scanner unit 112 to execute the job. In the case of the print job, the unit 305 operates the printer unit 113 to execute the job. A detailed description of execution of the jobs will be omitted. When a job ends, the unit 305 notifies the job log management unit 306 of a job result.

In step S704, the job flow management unit 304 queries of the job log management unit 306 about the job result, and then determines whether a job has normally ended. If the job has normally ended, the process returns to step S702 to continue the job flow; otherwise, the process advances to step S705 to execute job flow error processing. The job flow error processing in step S705 will be described later.

With the above flow, the digital multi-function peripheral 110 executes the job flow shown in FIG. 4 to transmit a document to a hot folder of the digital multi-function peripheral 120.

Note that this is a case in which the digital multi-function peripheral 110 executes the job flow shown in FIG. 4. Any device having the same arrangement as the digital multi-function peripheral 110 can perform the job flow shown in FIG. 4 by the same procedure. Also, the contents of the job flow are not limited to those in FIG. 4. Execution of the job flow in FIG. 4 is started using, as a trigger, an event other than data file storage in a hot folder. At the end stage, the job flow transmits processed data to a hot folder of another digital multi-function peripheral. That is, the job flow of FIG. 4 also serves as the start job flow at the initial position of the workflow.

Execution processing of the job flow shown in FIG. 5 in the digital multi-function peripheral 120 will be explained next. Assume that a folder monitoring unit 302 of the digital multi-function peripheral 120 is monitoring a folder.

Figure 8:
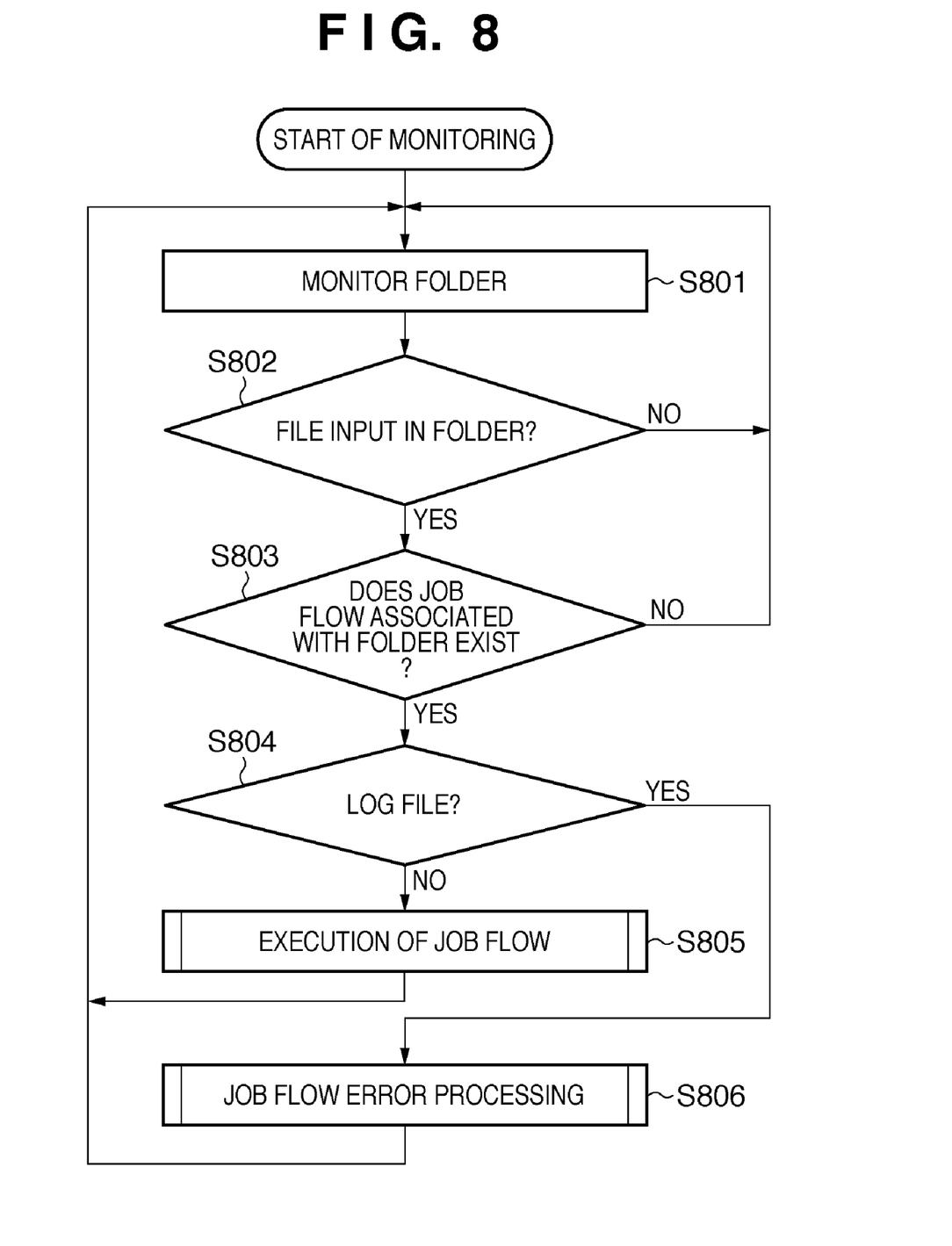
FIG. 8 is a flowchart for explaining folder monitoring of a hot folder.

FIG. 8 is a flowchart showing a flow from folder monitoring to job flow execution. In step S801, the folder monitoring unit 302 begins monitoring a public folder serving as a hot folder. In step S802, the unit 302 determines whether a file has been input to the monitoring folder. If the unit 302 determines that a file has been input, the process advances to step S803; otherwise, the process returns to step S801 to continue monitoring the folder.

In step S803, the folder monitoring unit 302 determines whether there exists a job flow associated with the hot folder in which the file has been input. If there exists a job flow associated with the folder, the process advances to step S804; otherwise, the process returns to step S801 to continue monitoring the folder. Note that a job flow associated with a hot folder is a job flow whose job element setting describes the identifier of the hot folder.

In step S804, the unit 302 determines whether the input file is a log file. In this example, assume that a log file has a common format predetermined between the digital multi-function peripherals. If the unit 302 determines that the input file is a log file, the process advances to step S806; otherwise, the process advances to step S805.

In step S805, the folder monitoring unit 302 instructs the job flow management unit 304 to execute the job flow. Execution processing of the job flow is the same as the flowchart in FIG. 7. In the case of the job flow in FIG. 5, the unit 304 executes the input job of the hot folder as a described initial job, and the job succeeds if the file input to the folder has a set format. After that, a job for executing database registration processing of the input file, a job for creating a result document, and a job for transmitting the result document to the digital multi-function peripheral 130 are executed.

In step S806, the unit 302 executes job flow error processing when a log is sent to the hot folder. This processing is the same as that in step S705 of FIG. 7, and a description thereof will be given later.

The flow from hot folder monitoring to job flow execution in the digital multi-function peripheral 120 has been described. Similarly, it is possible to realize execution of the job flow of FIG. 6 in the digital multi-function peripheral 130.

An example of performing the job flow shown in FIG. 5 by the digital multi-function peripheral 120 has been explained. Any device having the same arrangement as the digital multi-function peripheral 120, however, can execute the job flow by the same procedure. The contents of the job flow are not limited to those of FIG. 5 or 6. Furthermore, a plurality of job flows executed by a plurality of devices may exist between the job flow of FIG. 4 as the first job flow of the workflow and the job flow of FIG. 6 as the last job flow of the workflow.

Execution of the job flow in FIG. 5 is started using, as a trigger, data file storage in the hot folder. At the end stage, the job flow transmits processed data to a hot folder of another digital multi-function peripheral. That is, the job flow in FIG.

5 also serves as an intermediate job flow at the intermediate position of the workflow. Likewise, the job flow in FIG. 6 serves as the end job flow at the position of the end stage of the workflow.

As described above, in this embodiment, a workflow includes at least the start job flow and end job flow, and also includes an arbitrary number of intermediate job flows between them. Each job flow is executed by one device such as a digital multi-function peripheral including an image formation apparatus.

<Job Flow Error Processing>

The job flow error processing will now be explained. This processing is that in step S705 of FIG. 7 or step S806 of FIG. 8. That is, this corresponds to processing when a job fails in the job flow of the digital multi-function peripheral 110, 120, or 130 and a log is sent to the hot folder of the digital multi-function peripheral 120 or 130.

Figure 9:
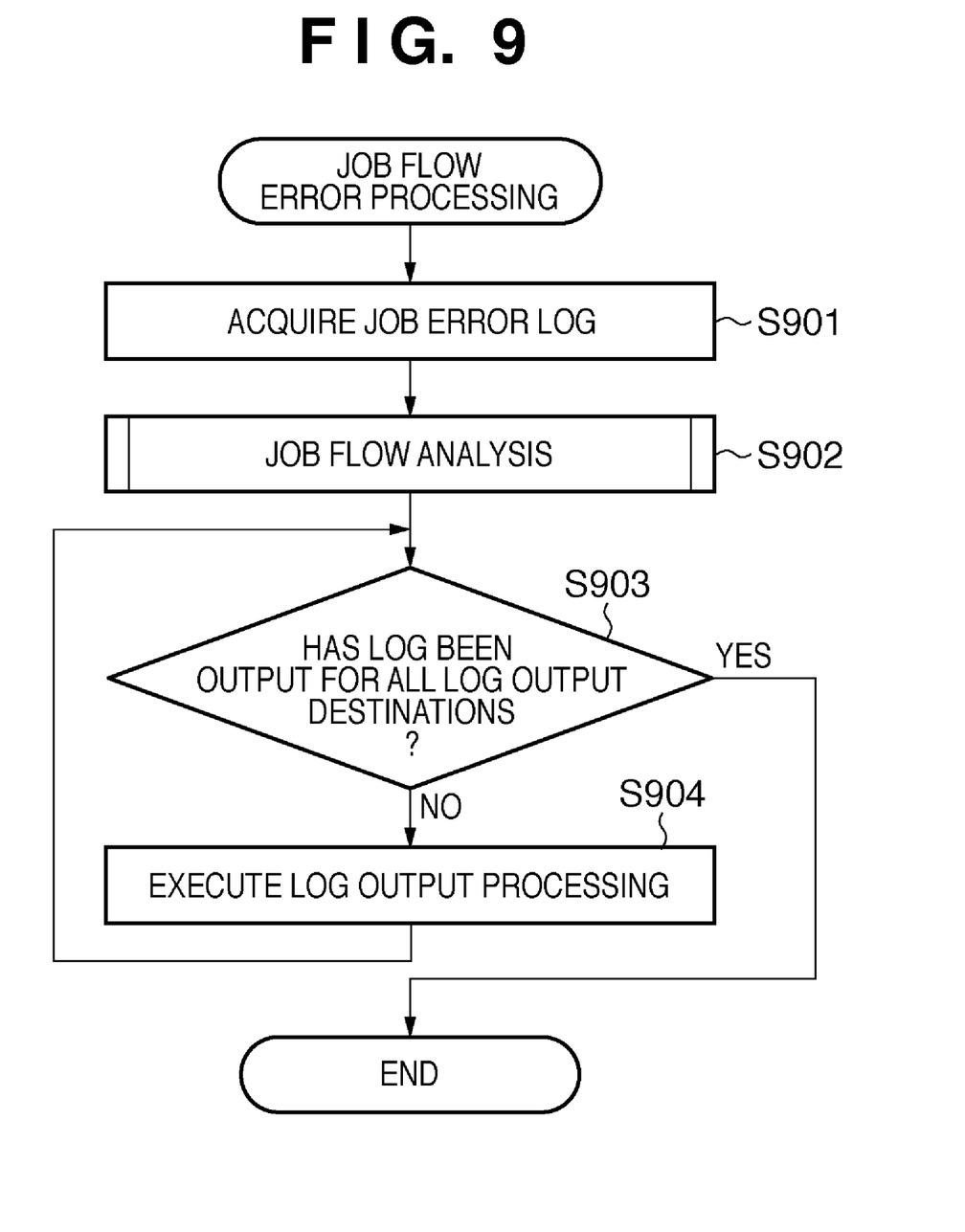
FIG. 9 is a flowchart for explaining job flow error processing.

FIG. 9 is a flowchart showing the job flow error processing. In step S901, the job flow management unit 304 acquires the error log of a failed job. When a job fails in a job flow, the unit 304 acquires an error log from the job log management unit 306. When a log file is input to a hot folder, the unit 304 reads out the input log file from the hot folder to acquire an error log.

Figure 10:
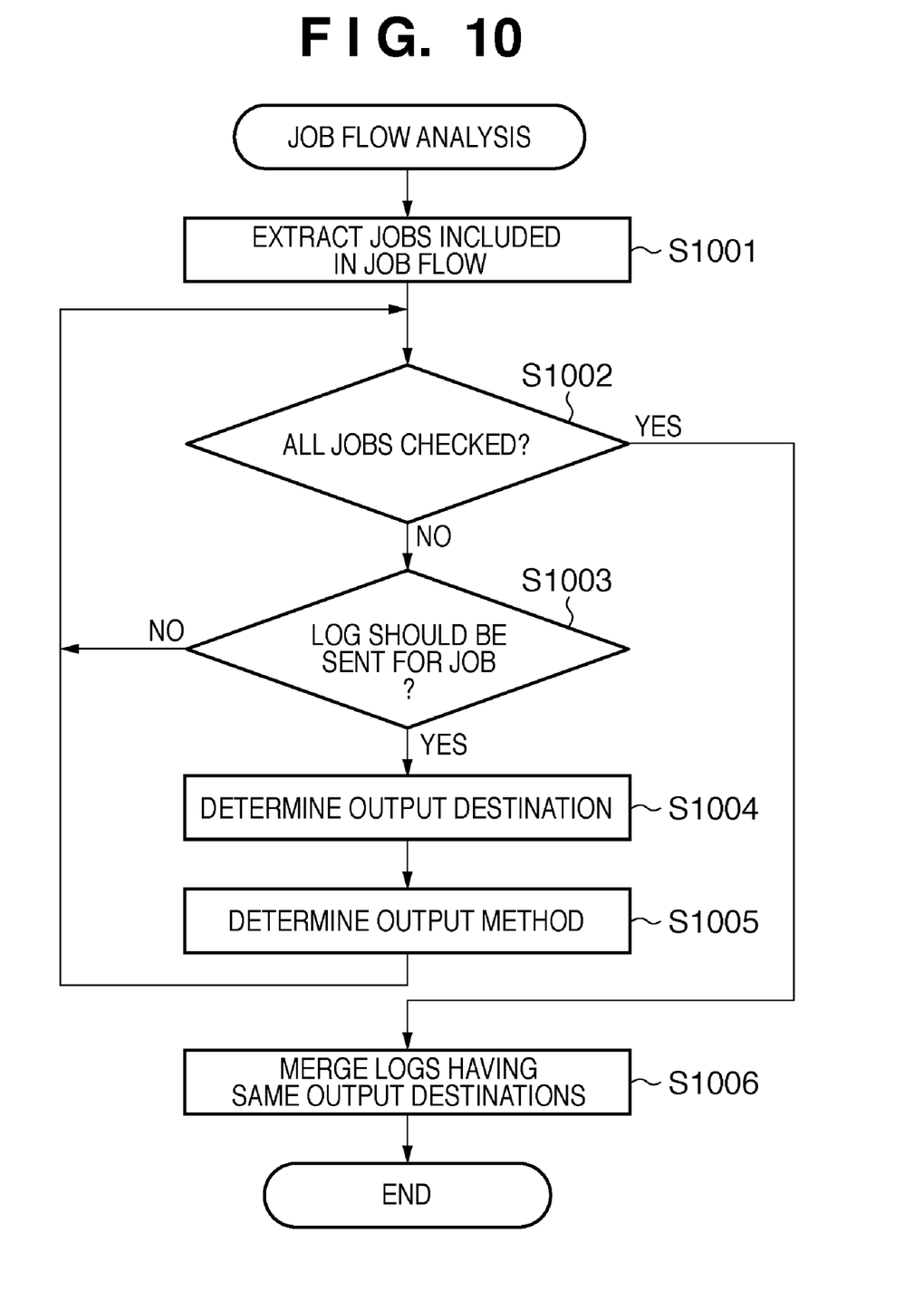
FIG. 10 is a flowchart for explaining job flow analysis.

In step S902, the unit 304 analyzes the target job flow. FIG. 10 is a flowchart showing the flow of the job flow analysis. In step S1001, the unit 304 extracts jobs included in the target job flow. In step S1002, the unit 304 determines whether it has checked all the jobs extracted in step S1001. If the unit 304 determined to have checked all the jobs, the process advances to step S1006; otherwise, the process advances to step S1003. In step S1003, the unit 304 determines whether a job to be checked is a job for which a log should be sent. That is, in this example, if the job abnormally ends, and a setting for sending a log is stored in the job flow setting file, the unit 304 determines to send a log. In this example, as for log notification setting, the unit 304 makes the determination based on whether a flag indicating if a notification should be sent is set in the job flow setting file. For example, the notifyLog element described in the tag 403 of FIG. 4 serves as the flag. If the value of the flag is "true", the unit 304 determines to send a notification. If the value is "false", the unit 304 determines not to send a notification. An error of a job is determined based on whether the job among the jobs included in the job flow ended normally. These determination criteria may be set as the settings of the workflow management unit in advance. In this case, it is possible to change the settings in accordance with the type of job. Alternatively, the determination criteria may be described as the settings of a job flow in the definition file of the job flow. In this case, it is possible to control the job flow on a job-by-job basis.

In this example, for example, if a job ends abnormally due to a job oversize error in database saving processing in the digital multi-function peripheral 120, the unit 304 determines that the transmission job indicated by the tag 505 in the job flow of FIG. 5 serves as a job for outputting a log. This is because the tag includes a notifyLog element, whose value is "true". When the digital multi-function peripheral 130 receives a log file from the hot folder, the unit 304 determines that the print job indicated by the tag 603 in the job flow of FIG. 6 serves as a job for outputting the log.

If it is determined that the job is a job for which a log should be sent, the process advances to step S1004; otherwise, the process returns to step S1002 to continue checking. In step S1004, the unit 304 executes output destination determination processing of determining (or deciding) the output destination of the log. The output destination varies for each type of job. In the case of the transmission job, the transmission destination is set as the output destination. In the case of the print job, a print job log (or print device (printer unit)) is set as the output destination. Assume that logic for determining the type of job and the output destination is set in the job flow management unit in advance.

In step S1005, the unit 304 determines a log output method. Similarly to step S1004, the log output method varies for each type of job. In the case of the transmission job, a transmission means used for transmission is adopted as an output method. In the case of the print job, writing in a print job log format is adopted as an output method. The process then returns to step S1002 to continue checking.

In step S1006, the output destinations and output methods for the logs are checked. If there exist logs for which the same output destinations and the same output methods are determined, the logs are merged to generate one log.

The flow of the job flow analysis has been described. With the above processing, the notification destination of an error log in a job flow is determined. A case in which one apparatus is set as a transmission destination has been given in this example. If, however, there exist two transmission jobs, it is possible to perform control to send a notification to two notification destinations, to send a notification to one of the notification destinations, or to send a notification to neither of them, by job flow settings.

In step S903, the job flow management unit 304 determines whether output processing has been executed for all the log output destinations determined in step S902. If the unit 304 determines that the output processing has been executed for all the output destinations, the process ends; otherwise, the process advances to step S904.

In step S904, the output processing (log output) is executed for a log output destination. If the log output destination is the log transmission destination, the job flow management unit 304 causes the job execution unit 305 to perform the transmission job of the log file. If the log output destination is a print job log, the job flow management unit 304 instructs the job log management unit 306 to keep the job log.

The job flow error processing has been explained. Assume that a job abnormally ends due to a job oversize error in the database saving processing in the digital multi-function peripheral 120. In this case, the digital multi-function peripheral 120 transmits a job log to the digital multi-function peripheral 130. A log indicating that it was impossible to print data due to a job oversize error in the saving processing is recorded in the job log of the print job of the digital multi-function peripheral 130. This log is output as printed matter. Consequently, the user who is waiting for output from a digital multi-function peripheral of the end stage of the workflow can acquire a job error log output from the digital multi-function peripheral instead of the output document, and know that an error has occurred during the workflow processing.

As described above, even when a workflow formed by concatenating job flows is executed and an error occurs in an apparatus arranged midway along the workflow processing path, the user can know the error midway through the workflow at an apparatus which allows the user to recognize a result. Assume that the digital multi-function peripheral 110 executes the workflow formed by concatenating the job flows in FIGS. 4 to 6 and an error occurs in the digital multi-function peripheral 120, for example. In this case, the user can refer to a print job log at the digital multi-function peripheral 130 with which the user sees a printed matter if the workflow normally ends. The user, therefore, can recognize why and where the error has occurred. Furthermore, since the path of the error log is the same as that of the data of the workflow, the timing of the error output is the same as or even earlier than that of normally processed output data. With this processing, it does not take a long time to know error occurrence and its location.

Although the job error processing is executed whenever an error occurs in any job in this example, it is also possible to set not to send a notification when an error occurs in a specific job. For example, an attribute representing that an error is ignored is set in a job flow setting file. If, in step S704, an error occurs in a job for which the attribute is enabled, it is possible to perform processing to ignore the error. With this processing, if the user can know an error on the spot, for example, if the scan job conducted at the beginning of a job flow fails, it is possible not to record the error at the log to be finally output.

The object of the present invention is also achieved when the computer (or the CPU or MPU) of a system or apparatus reads out program codes for implementing the procedures of the flowcharts described in the above-described embodiment from a storage medium storing the program codes, and executes them. In this case, the program codes read out from the storage medium implement the functions of the above-described embodiment. Therefore, the storage medium which stores the program codes constitutes the present invention.

As the storage medium for supplying the program codes, a floppy disk, hard disk, optical disk, magnetooptical disk, CD-ROM, CD-R, magnetic tape, nonvolatile memory card, and ROM are usable.

The functions of the above-described embodiment are implemented when the computer executes the readout program codes. Also, the present invention includes a case in which the functions of the above-described embodiment are implemented when an OS (Operating System) or the like running on the computer performs some or all of actual processes based on the instructions of the program codes.

Furthermore, the present invention includes the following case. That is, the program codes read out from the storage medium are written in the memory of a function expansion board inserted into the computer or the memory of a function expansion unit connected to the computer. The CPU of the function expansion board or function expansion unit performs some or all of actual processes based on the instructions of the program codes, thereby implementing the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-147072, filed Jun. 4, 2008, which is hereby incorporated by reference herein in its entirety.

What is claimed is:

1. A network device that is connected to a network and that executes a workflow by receiving document data, the network device comprising:

a detection unit that detects an input of data from another device;

a determination unit that determines whether the data whose input is detected by the detection unit is document data or error log data;

an execution unit that, when the determination unit determines that the data is document data, executes a job flow for the document data in accordance with a predefined job flow;

an output destination determination unit that determines an output destination of an error log based on workflow settings; and a log output unit that outputs the error log to the output destination of the error log determined by the output destination determination unit based on the workflow settings, when a job flow executed by the execution unit in the workflow fails or when the determination unit determines that the data is error log data, wherein the detection unit detects an input of data when the data is inputted in a folder, and the execution unit starts to execute a job flow when the determination unit determines that the data inputted in the folder is document data.

2. The network device according to claim 1,
wherein the log output unit performs processing designated for data upon receiving the data, and outputs the processed data to the output destination of the processed data determined by the output destination determination unit based on the workflow settings, and wherein the output destination of the error log is the same as the output destination of the processed data.

3. A network device according to claim 1, wherein the network device is incorporated in a workflow processing system that includes a plurality of the network devices connected via a network.

4. The network device according to claim 1, further comprising a merge unit that merges error logs having same output destinations determined by the output destination determination unit.

5. The network device according to claim 1, wherein the log output unit outputs two or more error logs to two or more destinations when the two or more destinations are determined by the output destination determination unit.

6. The network device according to claim 1, wherein a failure of a specific job flow executed by the execution unit in the workflow is ignored.

7. A workflow processing system comprising a plurality of network devices that sequentially execute a workflow, and that sequentially process processing steps defined in the workflow, wherein the plurality of network devices are interconnected via a network, and wherein each of the plurality of network devices comprise comprises:

a detection unit that detects an input of data from another device;

a determination unit that determines whether the data whose input is detected by the detection unit is document data or error log data;

an execution unit that, when the determination unit determines that the data is document data, executes a job flow for the document data in accordance with a predefined job flow;

an output destination determination unit that determines an output destination of an error log based on workflow settings; and a log output unit that outputs the error log to the output destination of the error log determined by the output destination determination unit based on the workflow settings, when a job flow executed by the execution unit in the workflow fails or when the determination unit determines that the data is error log data, wherein the detection unit detects an input of data when the data is inputted in a folder, and the execution unit starts to execute a job flow when the determination unit determines that the data inputted in the folder is document data.

8. A non-transitory computer-readable storage medium storing a computer program that when executed by a computer connected to a network causes the computer to execute a workflow processing method, the workflow processing method comprising steps of:

detecting an input of data from another device;

determining whether the data whose input is detected is document data or error log data;

when the data is determined to be document data, executing a job flow for the document data in accordance with a predefined job flow;

determining an output destination of an error log based on workflow settings; and when a job executed in the executing step in a workflow fails, or when the data is determined to be error log data, outputting the error log to the output destination of the error log determined in the output destination determination step based on the workflow settings, wherein the detecting step includes detecting an input of data when the data is inputted in a folder, and the executing step includes starting to execute a job flow when it is determined that the data inputted in the folder is document data.

9. A workflow processing method executed by a network device connected to a network, the workflow processing method comprising steps of:

detecting an input of data from another device;

determining whether the data whose input is detected is document data or error log data;

when the data is determined to be document data, executing a job flow for the document data in accordance with a predefined job flow;

determining an output destination of an error log based on workflow settings; and when a job executed in the executing step in a workflow fails, or when the data is determined to be error log data, outputting the error log to the output destination of the error log determined in the output destination determination step based on the workflow settings, wherein the detecting step includes detecting an input of data when the data is inputted in a folder, and the executing step includes starting to execute a job flow when it is determined that the data inputted in the folder is document data.

* * * * *